July 5, 1932.  W. G. KELLEY  1,865,765
BRACE
Filed June 29, 1928
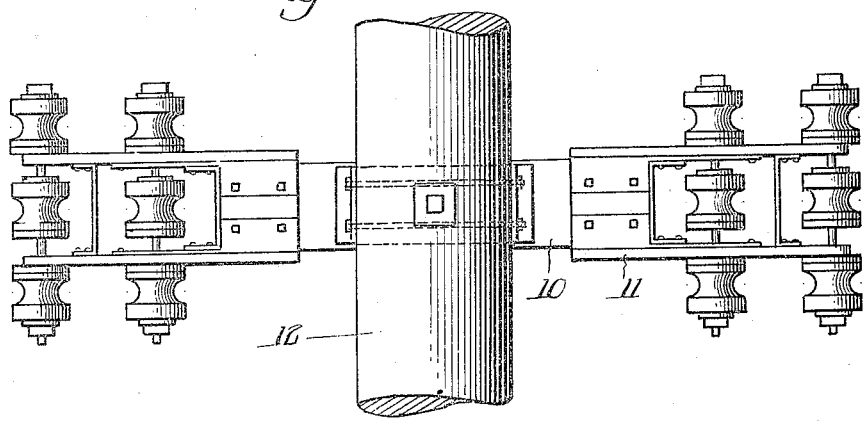
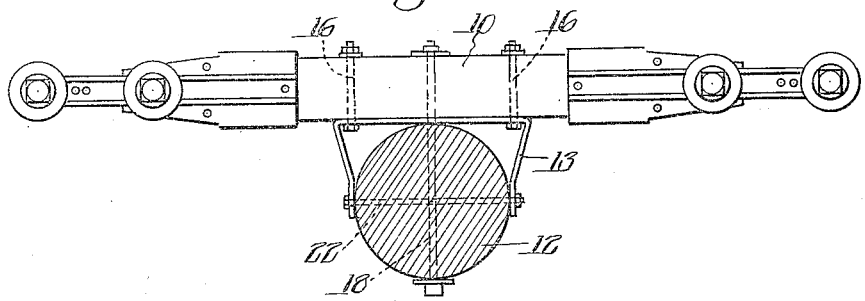
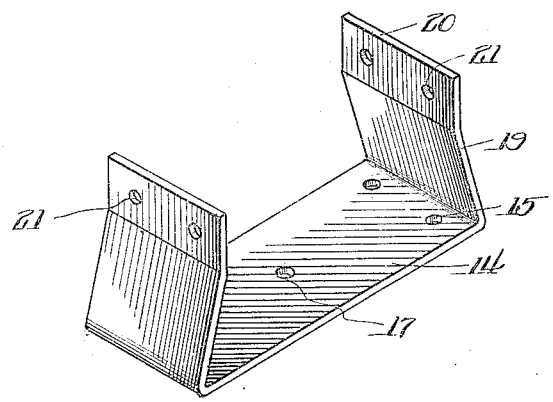
Inventor-
Will G. Kelley,
By Wilkinson, Huxley, Byron & Knight
Attys.

Patented July 5, 1932

1,865,765

UNITED STATES PATENT OFFICE

WILL G. KELLEY, OF WINNETKA, ILLINOIS

BRACE

Application filed June 29, 1928. Serial No. 289,185.

This invention pertains to braces and more particularly to brace members adapted to be used in connecting buck arms or other supports to a main support or pole.

Heretofore it has been the practice to secure buck arms or other supports to the main support or pole through distinct and separate members secured diagonally from the buck arm to the main support. However, such construction is not entirely satisfactory as a proper fastening cannot be had between the plurality of brace members and the main support, and also said braces are very much in the way, especially where a plurality of buck arms are used on the same support, and are also in the way of the workman making any repairs or installations adjacent said buck arms.

It is, therefore, an object of this invention to provide a brace which, while effective to support a buck arm to a main support, may yet be disposed so as not to interfere with any installation adjacent said supports.

Another object is to provide a brace which has widely separated points of fastening to the buck arm and main support, yet which utilizes a minimum of securing means.

A further object is to provide a structure which is inexpensive to manufacture and maintain, is of comparative light construction, can be made of waste material and fulfills all requirements of manufacture and service.

With these and various other objects in view, the invention may consist of certain novel features of construction and operation, as will be more fully described and particularly pointed out in the specification, drawing and claims appended hereto.

In the drawing which illustrates an embodiment of the device and wherein like reference characters are used to designate like parts—

Figure 1 is a fragmentary side elevation of a buck arm and support connection utilizing the brace which is the subject matter of this invention;

Figure 2 is a top plan view of the connection and structure illustrated in Figure 1; and Figure 3 is an enlarged perspective view of the brace.

The invention is shown as forming the fastening means between the buck arm 10 carrying the brackets 11, which brackets are particularly described in application, Serial No. 289,239, Patent No. 1,839,594, secured thereto in any convenient manner, and a pole or main support 12. The buck arm 10 is secured to the main support 12 through the brace 13 disposed therebetween, said brace consisting essentially of a substantially channel shaped member, said member having a web portion 14 provided with apertures 15 adapted to receive the bolt connections 16 for securing the web of the brace to the buck arm 10. The web is also provided with preferably an enlarged centrally disposed aperture 17 adapted to receive the nut and bolt connection 18 to form a securing means for the buck arm, the brace and the main support. Flanges 19 of the web toe inwardly so that a substantially diagonal brace is formed thereby, said flanges being reflanged as at 20 to form substantially parallel securing feet adapted to contact diametrically opposed portions of the main support 12. The flanges 20 are provided with aligned apertures 21 adapted to receive the nut and bolt connections 22 disposed through aligned apertures 21 to secure the flanges to the main support, thereby forming additional brace means between the buck arm and the main support, it being seen that the securing means 22 is shown located at a distance from the buck arm at least as great as the radius of said support.

It will be readily appreciated that with the structure shown a very efficient yet inexpensive structure is provided which can be readily applied to existing structures as well as to new constructions, and it is to be understood that I do not wish to be limited by the exact embodiment of the device shown, which is merely by way of illustration and not limitation, as various and other forms of the device will, of course, be apparent to those skilled in the art without departing from the spirit of the invention or the scope of the claims.

I claim:

1. A bracket for securing a buck arm to a main support, including an arm engaging portion provided with apertures for receiving securing means from said arm, spaced flanged portions provided at the ends of said first named portion extending toward the main support, said flanged portions being provided with substantially parallel reflanged portions contacting the main support and provided with apertures for receiving securing means for fastening said bracket to said support, and securing means passing through said main support, said arm and said first named portion for securing together said main support, said arm and said first named portion.

2. A bracket for securing a buck arm substantially at right angles to a main support on one side of said support, including an arm engaging portion of greater length than the diameter of the support, said arm engaging portion having flanges at the ends thereof extending inwardly, said flanges being reflanged to provide substantially parallel flanges spaced apart a distance substantially equal to the diameter of said support fastening means extending through said first named portion, said arm and said support, and spaced securing means extending through said last named flanges and said support.

3. A bracket for securing a buck arm substantially at right angles to a main support on one side of said support, including an arm engaging portion of greater length than the diameter of the support, said arm engaging portion having flanges at the ends thereof extending inwardly, said flanges being reflanged to provide substantially parallel flanges spaced apart a distance substantially equal to the diameter of said support, fastening means extending through said first named portion, said arm and said support, and spaced securing means extending through said last named flanges and said support, said last named fastening means being spaced from said arm a distance at least as great as the radius of said support.

4. A bracket for securing a buck arm substantially at right angles to a main support on one side of said support, including an arm engaging portion of greater length than the diameter of the support and fastening means extending through said arm and said portion adjacent the ends of said portion, said arm engaging portion having flanges at the ends thereof extending inwardly, said flanges being reflanged to provide substantially parallel flanges spaced apart a distance substantially equal to the diameter of said support, fastening means extending through said first named portion, said arm and said support, and spaced securing means extending through said last named flanges and said support.

Signed at Chicago, Illinois, this 27th day of June, 1928.

WILL G. KELLEY.